July 17, 1956

A. E. MERANCY ET AL 2,754,834

VEHICLE WASHING MACHINE

Filed March 28, 1952

Arthur E. Merancy
Thomas Weisz
INVENTORS

BY *[signatures]*
Attorneys

July 17, 1956 A. E. MERANCY ET AL 2,754,834
VEHICLE WASHING MACHINE
Filed March 28, 1952 8 Sheets-Sheet 2
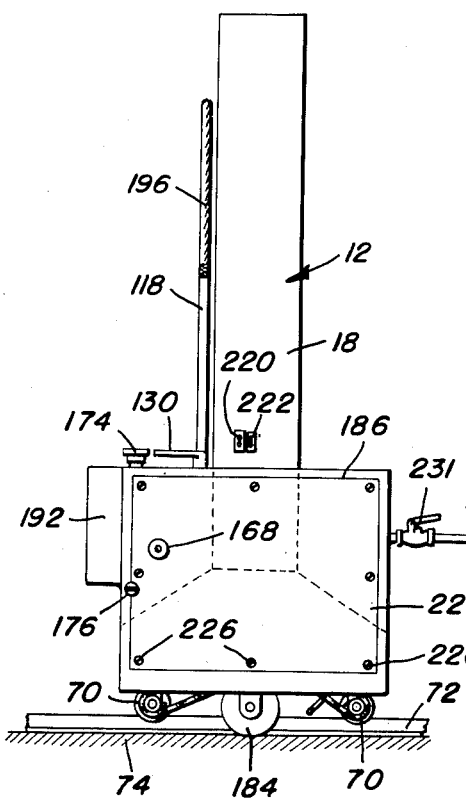
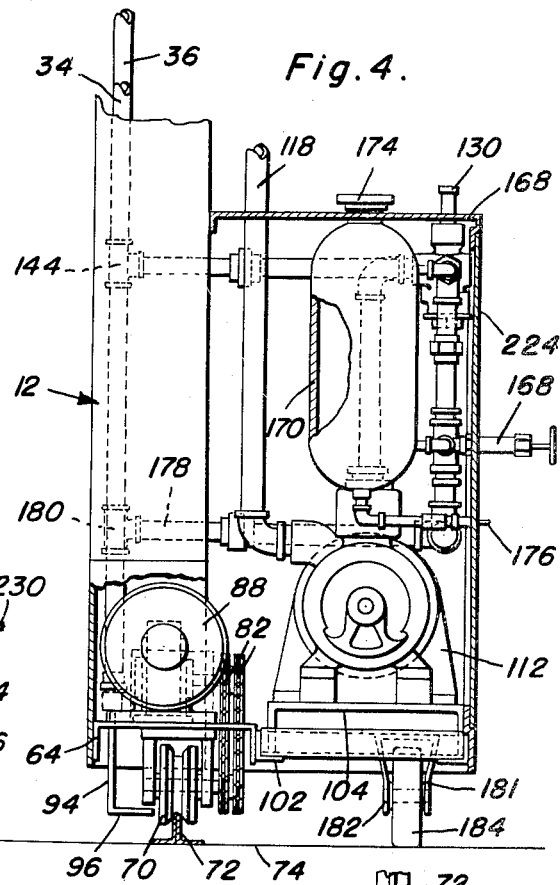
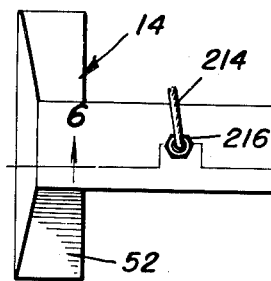
Arthur E. Merancy
Thomas Weisz
INVENTORS
BY *Clarence A. O'Brien*
*and Harvey B. Jackson*
Attorneys July 17, 1956 A. E. MERANCY ET AL 2,754,834
VEHICLE WASHING MACHINE
Filed March 28, 1952 8 Sheets-Sheet 3

Arthur E. Merancy
Thomas Weisz
INVENTORS

BY *Clarence A. O'Brien*
*and Harvey B. Jackson*
Attorneys

July 17, 1956
A. E. MERANCY ET AL
2,754,834
VEHICLE WASHING MACHINE
Filed March 28, 1952
8 Sheets-Sheet 4
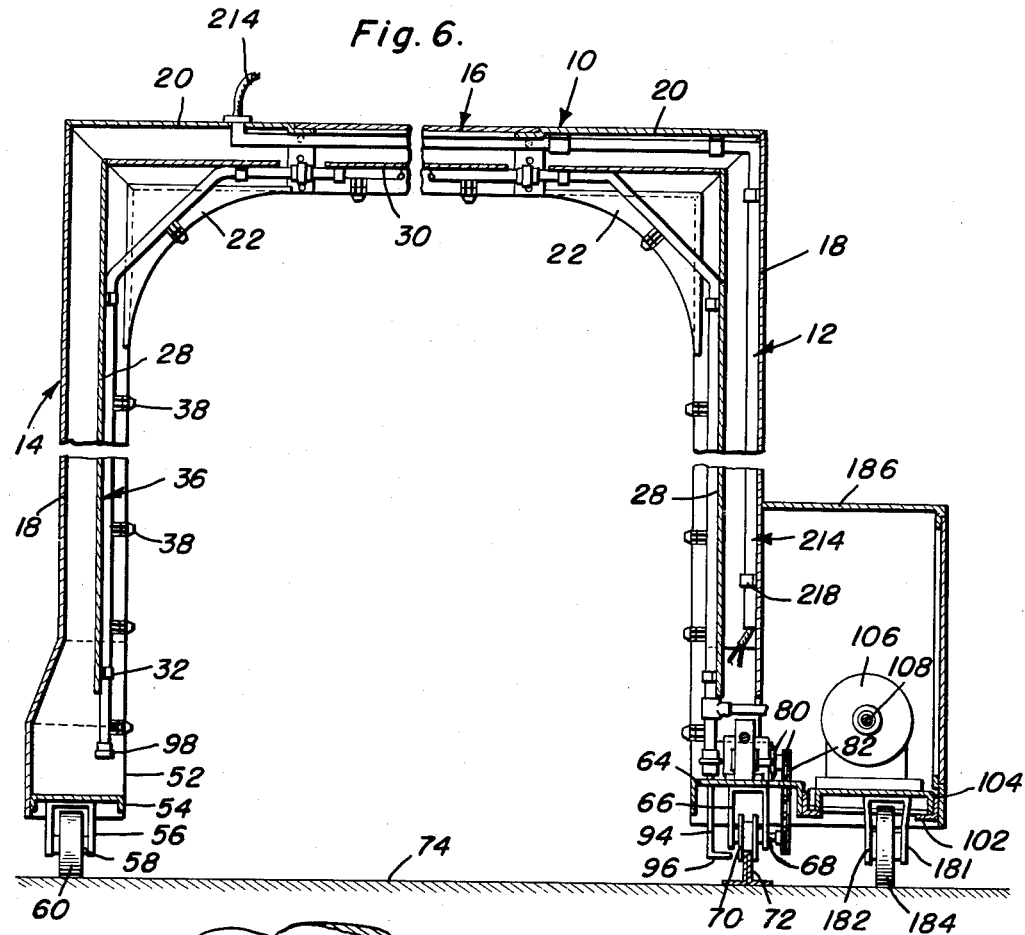
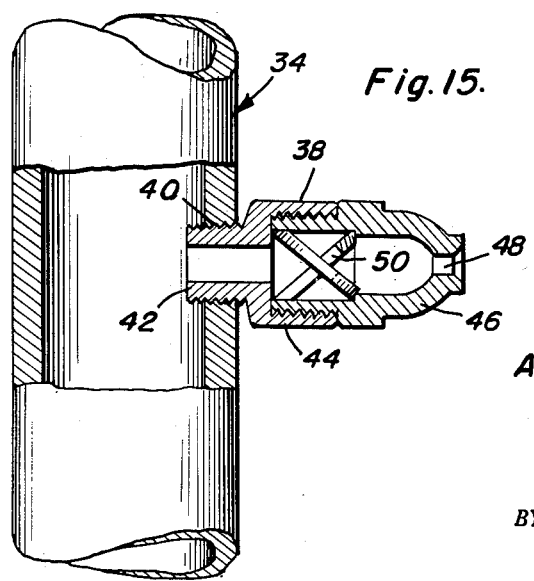
Arthur E. Merancy
Thomas Weisz
INVENTORS July 17, 1956 A. E. MERANCY ET AL 2,754,834
VEHICLE WASHING MACHINE
Filed March 28, 1952 8 Sheets-Sheet 5

Arthur E. Merancy
Thomas Weisz
INVENTORS

BY
Attorneys

Arthur E. Merancy
Thomas Weisz
INVENTORS

July 17, 1956
A. E. MERANCY ET AL
2,754,834
VEHICLE WASHING MACHINE
Filed March 28, 1952
8 Sheets-Sheet 7
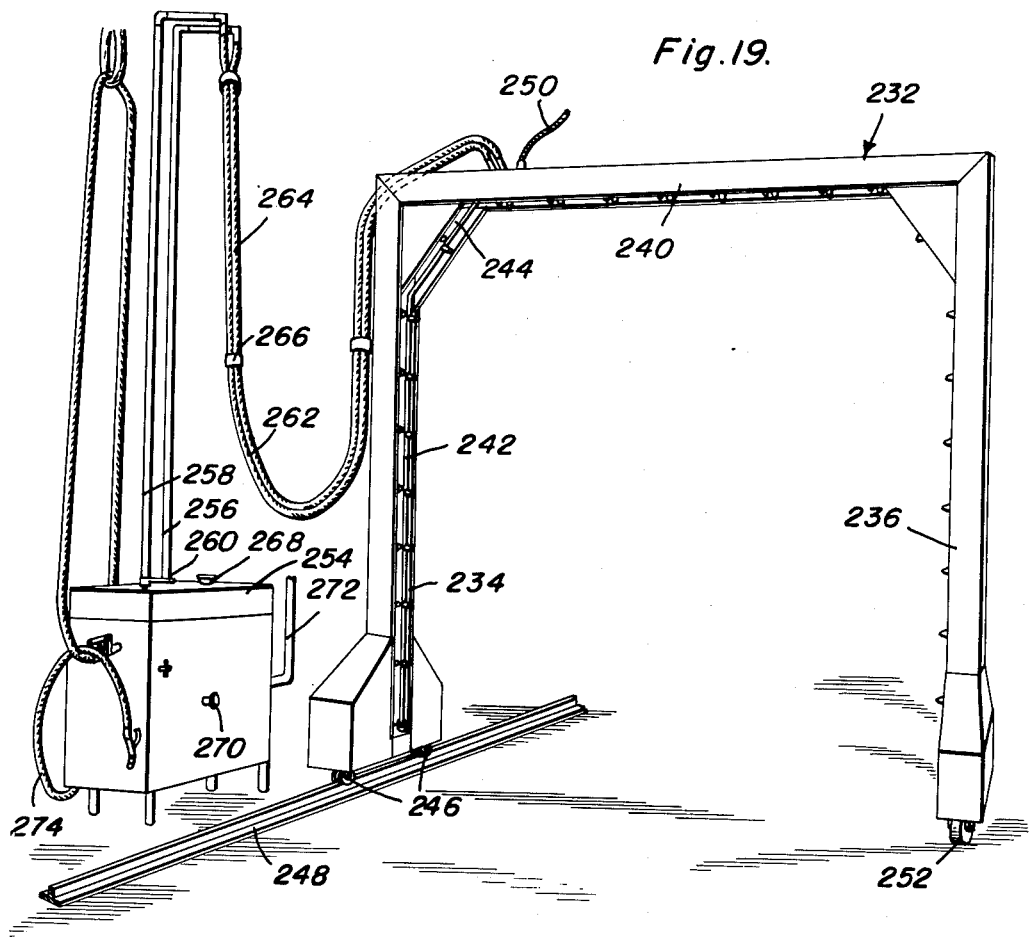
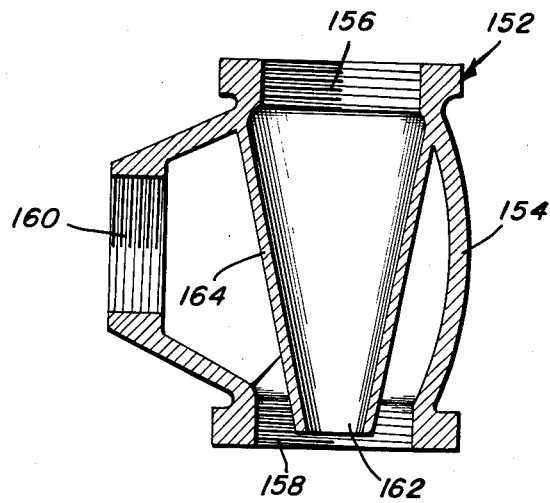
Arthur E. Merancy
Thomas Weisz
INVENTORS
BY
Attorneys July 17, 1956  A. E. MERANCY ET AL  2,754,834
VEHICLE WASHING MACHINE
Filed March 28, 1952  8 Sheets-Sheet 8

Arthur E. Merancy
Thomas Weisz
INVENTORS

United States Patent Office 2,754,834
Patented July 17, 1956

2,754,834

VEHICLE WASHING MACHINE

Arthur E. Merancy and Thomas Weisz, Ansonia, Conn.; said Merancy assignor to said Weisz Application March 28, 1952, Serial No. 279,136

11 Claims. (Cl. 134—57)

This invention relates to new and useful improvements in vehicle washing machines, and is directed to subject matter similar to that disclosed in our copending application filed November 25, 1949, Serial No. 129,392, now Patent No. 2,703,579, granted March 8, 1955.

The primary object of this invention is to provide an improved vehicle washer which is self-contained and is adapted to automatically wash and rinse a stationary vehicle by providing a spray frame reciprocable over a vehicle and encompassing the sides and top of the vehicle during such movement.

Another object of the this invention is to provide an improved vehicle washer which includes a frame for carrying spray pipes, said frame having associated therewith for reciprocating movement a platform which supports means for selectively supplying fluids to said spray pipes under pressure whereby said vehicle washer is completely independent with the exception of power lines and fluid supply lines attached thereto.

Another object of this invention is to provide an improved vehicle washer including a U-shaped spray frame having a spray loop system mounted thereon, said U-shaped frame and spray loop system being automatically reciprocated over a stationary vehicle and which is adapted to selectively delivering a wash fluid and a rinse fluid onto the sides and top of a vehicle, said delivery occurring during the movement of the frame and being selectively initiated by an operator.

Another object of this invention is to provide an improved vehicle washer whose movement over a vehicle is automatically controlled and whose wash mechanism reciprocates with the vehicle washer and has control means conveniently positioned thereon whereby the service of only one operator is required.

Another object of this invention is to provide an improved vehicle washer which includes a U-shaped frame adapted for reciprocation of a stationary vehicle, said U-shaped frame being provided with support means on the lower end of its legs, said support means including a single track engaged by wheels carried by said U-shaped frame for guidingly controlling the movement of the U-shaped frame.

Another object of this invention is to provide an improved guiding and supporting means for a vehicle washer, said guiding and supporting means consisting of a single track engaged by a pair of longitudinally aligned wheels carried by one leg of a U-shaped frame forming a major portion of the vehicle washer, said single track being the only necessary fitting which requires mounting in the area in which the vehicle washer is intended to be disposed.

A further object of this invention is to provide an improved vehicle washer which is in the form of a compact and complete unit adapted for reciprocating movement over a stationary vehicle, said vehicle washer being adapted to be driven along a single track whereby a minimum of installation time is required and the vehicle washer requires the services of only one operator so as to make the vehicle washer economically feasible.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 2 is a side elevational view of the vehicle washer of Figure 1 and showing the general arrangement of the vehicle washer and a track on which one portion of the vehicle washer is supported for guiding movement of the vehicle washer when it is reciprocating back and forth over a vehicle to be washed;

Figure 3 is a top plan view of the vehicle washer of Figure 1 and shows the general relationship of a control mounting platform with respect to the U-shaped frame which forms the major portion of the vehicle washer;

Figure 4 is an enlarged fragmentary transverse vertical sectional view taken substantially on the plane indicated by the section line 4—4 of Figure 3 and showing the general arrangement of the drive means and fluid control means for the vehicle washer of Figure 1;

Figure 6 is a transverse vertical sectional view taken substantially through the center of the vehicle washer along the plane indicated by the section line 6—6 of Figure 3 and shows the general relationship of the various portions of the vehicle washer including the general construction of the spray pipes;

Figure 1:
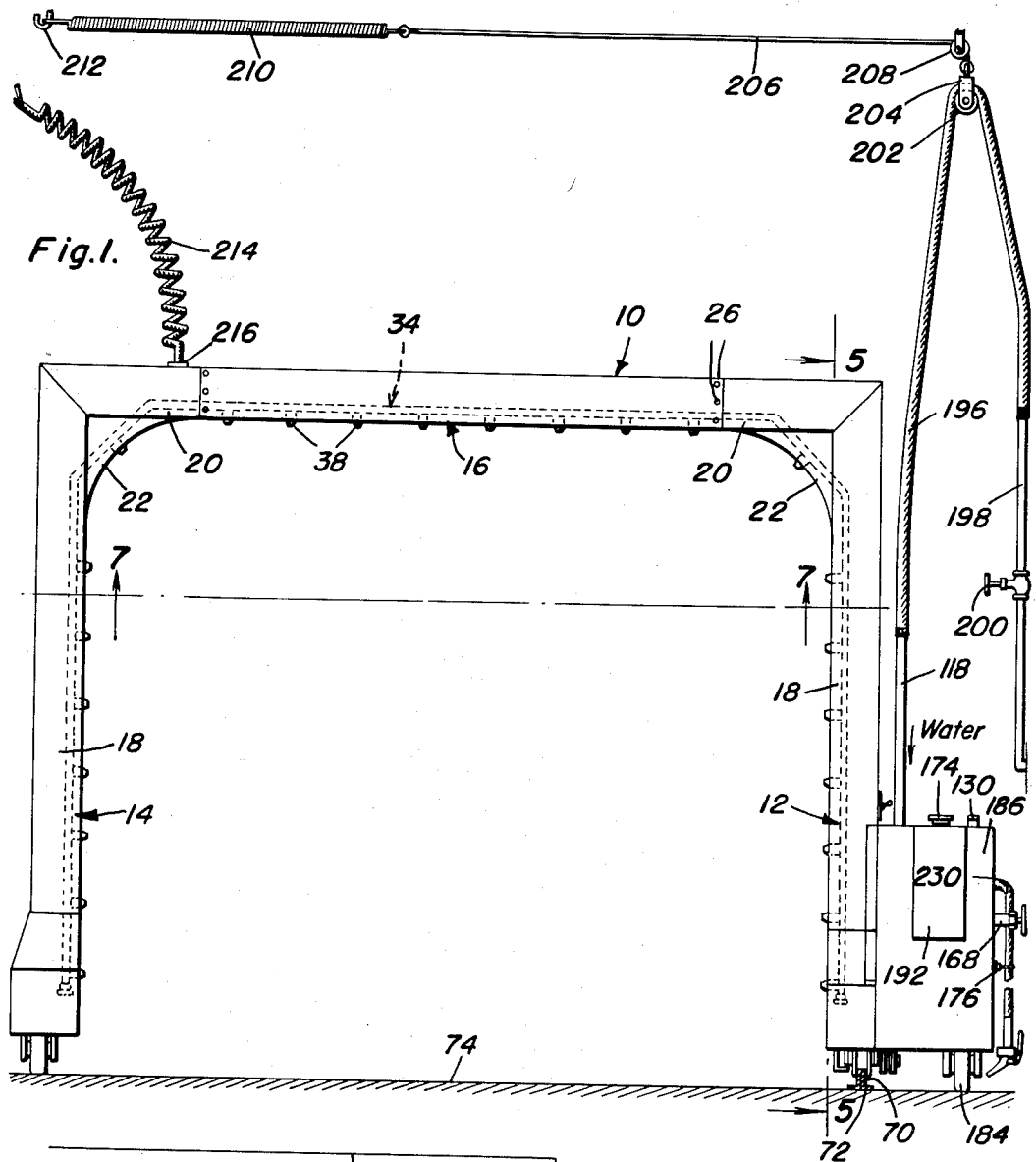
Figure 1 is a front elevational view of a preferred modification of the vehicle washer and shows the complete unit including electrical and fluid supply lines.
Figure 18:
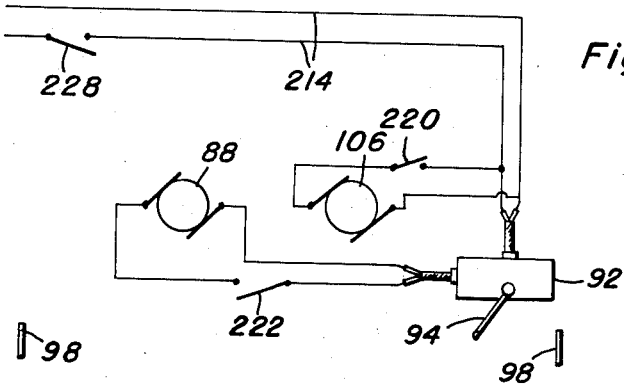
Figure 5:
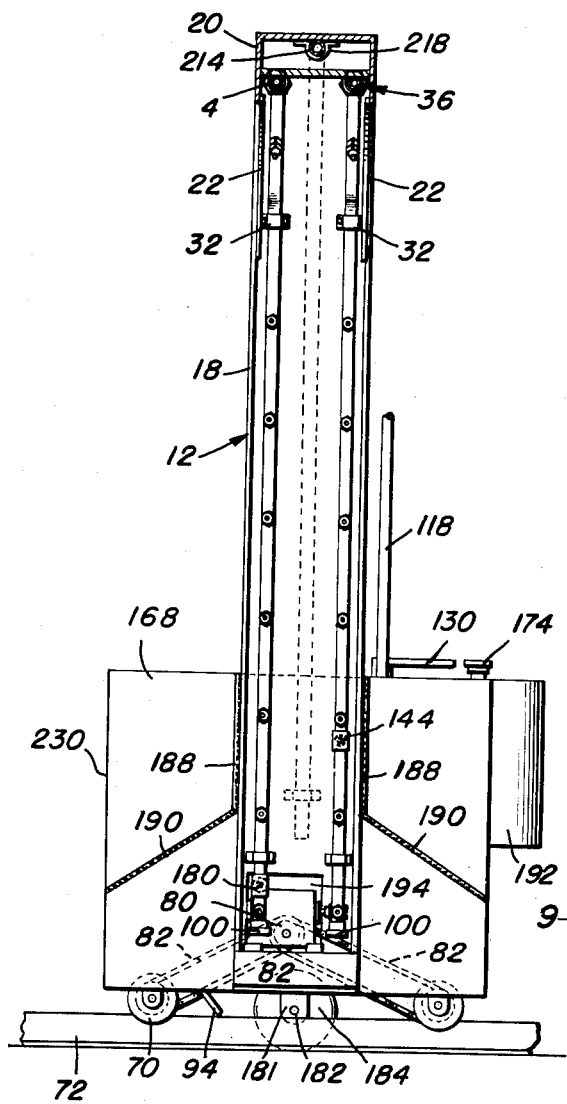
Figure 5 is an enlarged transverse vertical sectional view taken substantially upon the plane indicated by the section line 5—5 of Figure 1 and showing the general arrangement of the spray pipes with respect to one of the legs of the U-shaped frame and the actuating means mounted therein.
Figure 9:
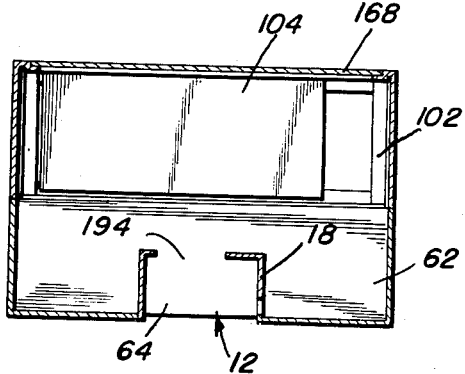
Figure 9 is a transverse horizontal sectional view taken substantially upon the plane indicated by the section line 9—9 of Figure 8 and showing the general construction of the one leg of the U-shaped frame.
Figure 8:
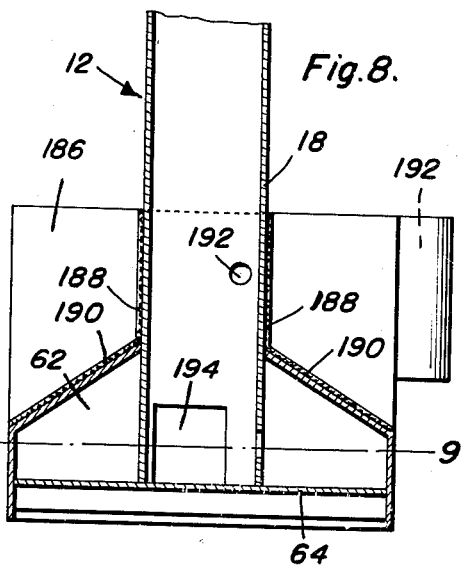
Figure 8 is an enlarged fragmentary transverse sectional view through the lower portion of the leg of the U-shaped frame having the actuating means and fluid control means attached thereto, the frame per se being illustrated.
Figure 16:
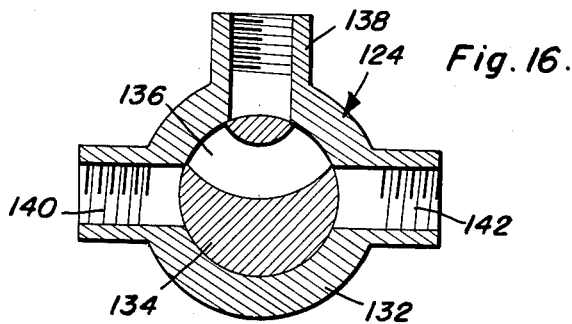
Figure 22:
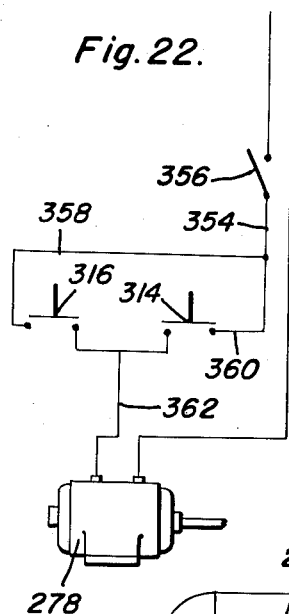
Figure 20:
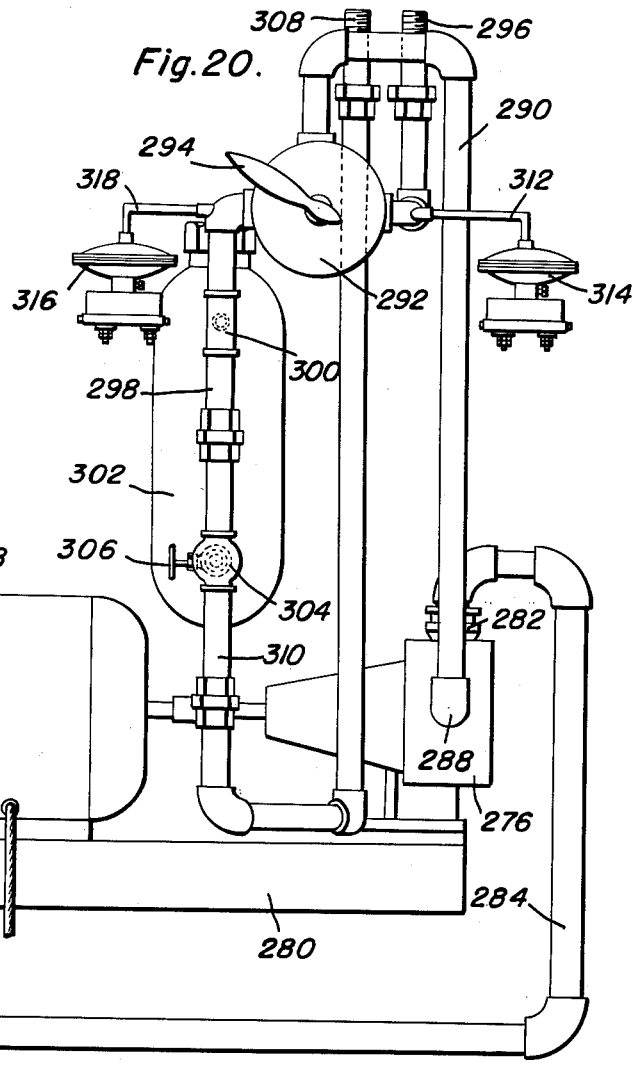
Figure 21:
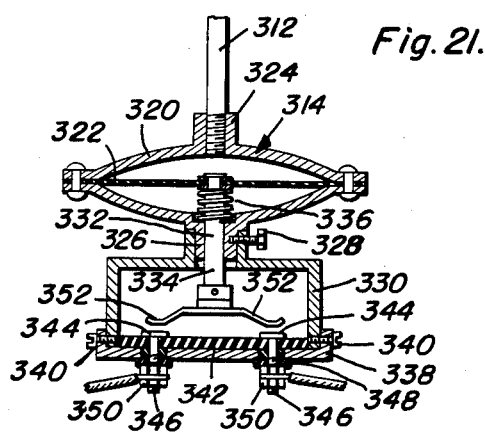

Figure 15 is an enlarged fragmentary front elevational view of a portion of one of the spray pipes of the vehicle washer of Figure 1, and showing the general arrangement of a spray nozzle secured thereto, the spray pipe and the spray nozzle being broken away and shown in section in order to clearly illustrate the construction of the spray nozzle and the manner in which it is attached to the spray pipe;

Figure 16 is an enlarged transverse cross sectional view taken through a diverter valve for selectively controlling the flow of fluid to either of the spray pipes;

Figure 17 is an enlarged transverse vertical sectional view taken through the center of a venturi T which is utilized in the introducing of a detergent to the washing fluid;

Figure 18 is a wiring diagram showing the manner in which the reciprocating movement of the vehicle washer is controlled and the switch means for the motor of a pump which is utilized for increasing the pressure of the washing and rinsing fluid;

Figure 19 is a perspective view of a modified form of the vehicle washer, the means for controlling the flow of the spray fluids being mounted in a stationary cabinet and the spray pipes being connected thereto by flexible lines;

Figure 20 is an elevational view of a modified form of fluid control means which includes valves for controlling the actuation of the motor for driving the pressure pump;

Figure 21 is a transverse vertical sectional view taken through one of the valves for controlling the operation of the pump motor and showing the general construction thereof; and Figure 22 is a schematic wiring diagram showing the manner in which the valves control the actuation of the electric motor for the pressure pump.

Similar characters of reference designate similar or identical elements and portions throughout the specification and throughout the different views of the drawings.

Referring now to the drawings in detail, it will be seen that the preferred modification of the invention which is illustrated in Figures 1 through 18, inclusive, includes a generally U-shaped frame which acts as a carrier for the washing equipment of the vehicle washer and is referred to in general by the reference numeral 10. The U-shaped frame 10 is made in three sections and includes a first leg 12 which extends vertically and is in spaced parallel relation to a second leg 14, the legs 12 and 14 being joined at their upper ends by a horizontally extending web 16. As is best illustrated in Figures 1 and 7, each of the legs 12 and 14 are generally L-shaped and includes a vertical portion 18 and a horizontal portion 20, the portions 18 and 20 being channel-shaped in cross-section and connected together by gussets 22 which are mounted within the flanges of the channels and secured thereto.

Figure 7:
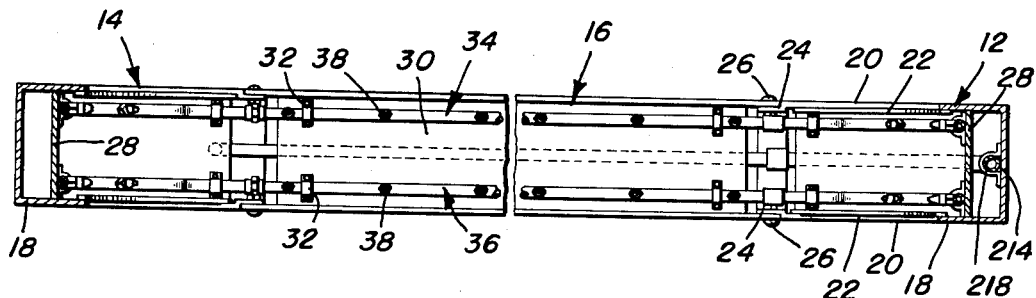
Figure 7 is an enlarged transverse horizontal sectional view taken substantially on the plane indicated by the section line 7—7 of Figure 1 and showing the general construction of the U-shaped frame and the relationship of the spray pipes thereto, the central portion of the frame being broken away and omitted.
Figures 12, 14:
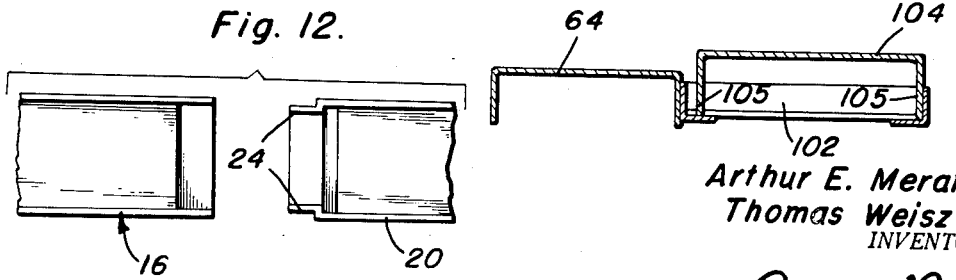
Figure 12 is an enlarged fragmentary exploded bottom horizontal view of a connection between one of the legs and the top horizontal portion forming the web of the U-shaped frame.
Figure 14 is a transverse vertical sectional view taken substantially upon the plane indicated by the section line 14—14 of Figure 13 and showing the general construction of the two bases.

Referring now to Figures 7 and 12, it will be seen that the horizontal portion 20 of one of the legs 12 and 14 has the free ends of its flanges offset inwardly as at 24 so as to telescope within the web 16. The horizontal portion 20 is secured to the web 16 by fasteners 26 which are best illustrated in Figure 1.

In order that the frame 10 may function as a vehicle washer frame, the legs 12 and 14 and the web 16 are provided with plates 28 and 30, respectively, which are in spaced parallel relation to their associated webs. Secured to the plates 28 and 30 by clamps 32 is a pair of spaced parallel spray pipes which are referred to in general by the reference numerals 34 and 36. The spray pipes 34 and 36 are substantially identical and are provided at spaced intervals with spray nozzles 38. Referring now to Figure 15 in particular, it will be seen that there is illustrated one of the spray nozzles 38 secured to the spray pipe 34, the spray pipe 34 being provided with a threaded bore 40 through its side wall. Mounted in the threaded bore 40 is a threaded end 42 of a reducing fitting 44 in which is threadedly mounted a spray nozzle tip 46 having a reduced orifice or opening 48 in the other end thereof. Disposed within the spray tip 46 is a spiral diverter plate 50 for imparting a rotary motion to fluid passing through the spray nozzle 38.

Referring now to Figures 3 and 6, it will be seen that the leg 14 is of a generally inverted T-shaped construction and includes an enlarged housing 52 at the lower end thereof. The bottom of the enlarged housing 52 is closed by an inverted channel-shaped plate 54 which extends horizontally and is supported by the enlarged housing 52. Carried by the channel 54 is a downwardly extending channel-shaped mounting bracket 56 having an axle 58 extending transversely between downwardly extending flanges thereof. Mounted on the axle 58 for rotation is a ground engaging wheel 60 which supports the leg 14 of the U-shaped frame 10.

The leg 12 is also of a generally inverted T-shaped construction and includes a housing 62 which is closed by a longitudinally extending horizontally disposed channel member 64, the flanges of the channel member 64 extending downwardly. Carried by the channel 64 and secured to the underside of the web thereof is a pair of longitudinally spaced U-shaped mounting brackets 66. The mounting brackets 66 have axles 68 extending between and journaled in the legs thereof adjacent the lower ends. Mounted on the axles 68 for rotation therewith are track engaging wheels 70 which are circumferentially grooved and in engagement with an inverted T-shaped track 72. It will be noted that the channel member 64 is positioned above the general plane of the channel member 54 and the bottom of the wheels 70 or above the bottom of the wheel 60 so that the combined height of the track 72 and the wheels 70 is compensated for and the inverted U-shaped frame 10 is an even keel when the track 72 and the wheel 60 are mounted upon a lever surface 74. It will be understood that this lever surface 74 will be the floor of a conventional garage or other suitable structure.

Figure 10:
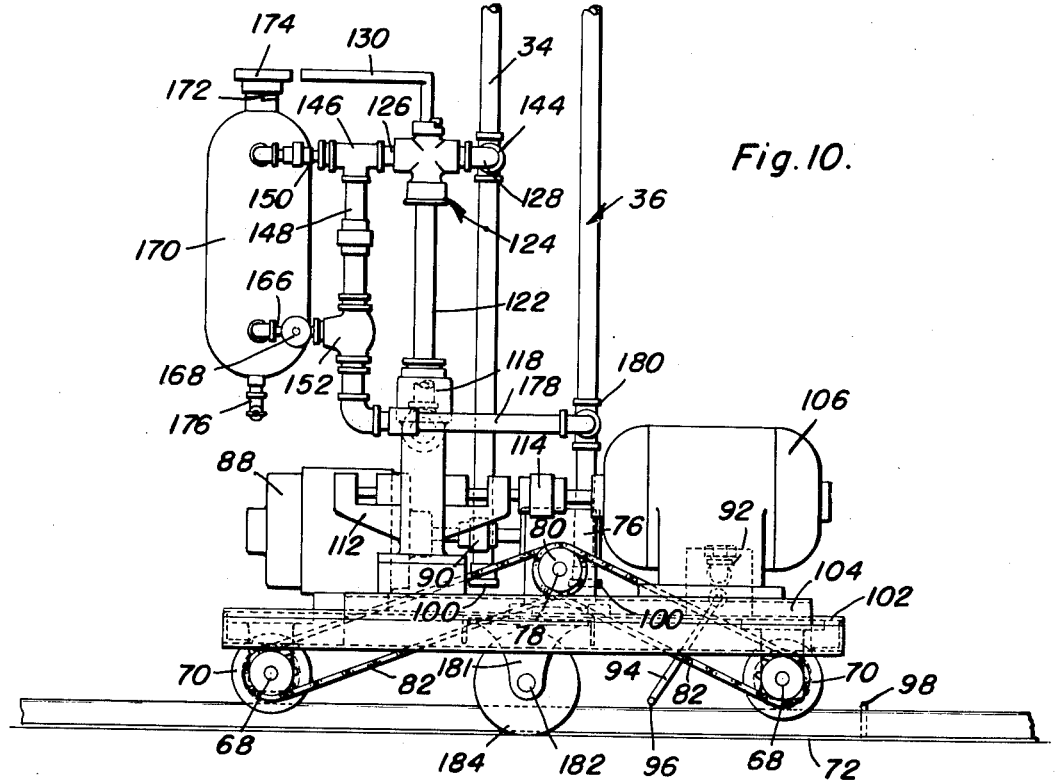
Figure 10 is an enlarged side elevational view of the frame actuating mechanism and the fluid control means of the vehicle washer of Figure 1, the U-shaped frame and the housing surrounding the fluid control means being omitted.
Figure 11:
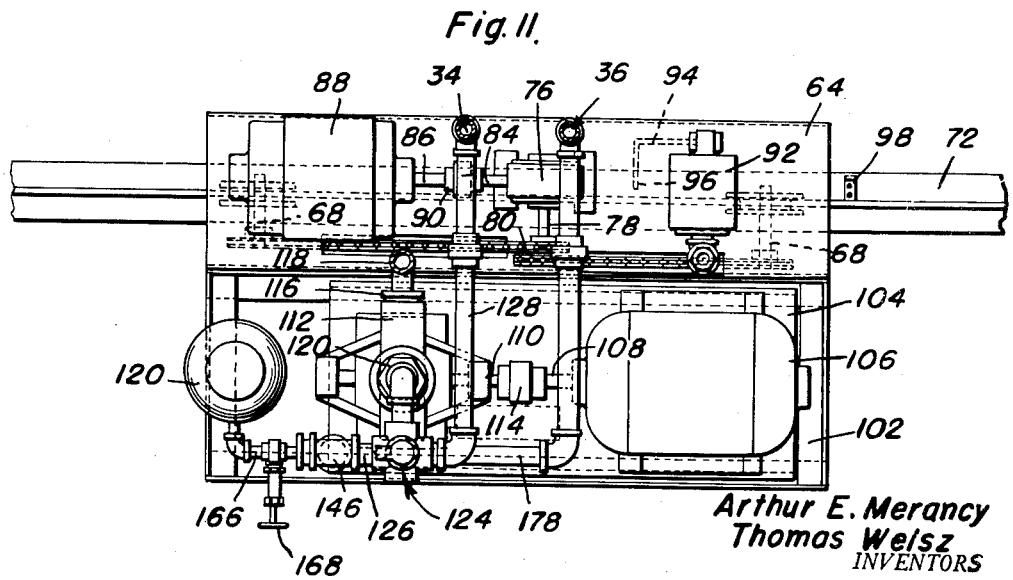
Figure 11 is a top plan view of the means for reciprocatingly driving the U-shaped frame and the means for controlling the flow of fluids during a washing operation illustrated in Figure 10.

Referring now to Figures 10 and 11 in particular, it will be seen that the channel member 64 has mounted on the upper surface of its web a speed reducer 76 having a shaft extending from one side thereof and transversely to the track 72, the shaft being referred to by the reference numeral 78. Carried by the shaft 78 is a pair of sprockets 80 which are connected to sprockets carried by the axles 68 by drive chains 82. The speed reducer 76 is provided with a second shaft 84 extending longitudinally at one end thereof and connected to a drive shaft 86 of an electric motor 88 by a coupling 90.

Also mounted on the channel member 64 is a switch 92 operatively connected to the electric motor 88 for supplying current thereto. The switch 92 is provided with an actuating arm 94 which is generally L-shaped and has a lower portion 96 which extends substantially horizontally. Carried by the track 72 adjacent each end thereof is a plate 98 which extends upwardly from the base. As the U-shaped frame moves towards one end of the track 72 the lower horizontal portion 96 of the actuating arm 94 engages the associated plate 98 and as the U-shaped frame 10 proceeds along the track 72, the actuating arm 94 is pivoted causing the switch mechanism in the switch 92 to be actuated. This results in the change of the direction of current to the motor 88 which is of the reversing type and permits the U-shaped frame 10 to be driven in the opposite direction towards the other end of the track 72. When the U-shaped frame 10 reaches the other end of the track 72 the actuating arm 94 engages the plate 98 at the other end of the track and once again the direction of travel of the U-shaped frame is reversed which results in an automatic reciprocating movement of the U-shaped frame 10. It will be understood that the assembly illustrated in Figure 10 has reached the end of the travel along the track 72 to the right and that the actuating arm 94 of the switch 92 has been rotated by engagement with the plate 98 and the mechanism is now moving to the left.

Inasmuch as the U-shaped frame needs to travel in a straight line only, the provision of the two track engaging wheels 70 on one side of the U-shaped frame 10 in longitudinally spaced relation permits the guiding of the U-shaped frame along its desired path of travel. Since the U-shaped frame cannot twist with respect to the track 72, it is obvious that the plane of the U-shaped frame 10 must remain normal to the longitudinal axis of the track 72 and, therefore, no track is needed on the other side. In view of this situation, it is obvious that it is much easier to install a vehicle washer which requires only one track to be secured to the supporting surface 74 than it would to install a vehicle washer which requires two tracks, such as the track 72, to the supporting surface 74.

In order that a vehicle may be properly washed, it is necessary to supply fluid to the spray pipes 34 and 36 under a high pressure. In order to accomplish this, the spray pipes 34 and 36 are provided with closed ends which include caps 98 mounted on the ends thereof disposed within the housing 52 of the leg 14. The other ends of the spray pipes 34 and 36 are disposed within the housing 62 and are provided with caps 100 at their lower ends.

In order to fully understand the piping system of the vehicle washer which is the subject of the present invention, it must be understood that during the course of a vehicle washing operation the machine first sprays the vehicle with a wash water which has a detergent added thereto, and after the vehicle has been thoroughly washed the vehicle is sprayed with rinse water. In order that this may be true, the spray pipe 34 is utilized for spraying rinse water only and the spray pipe 36 is utilized for conveying washing water.

Figure 13:
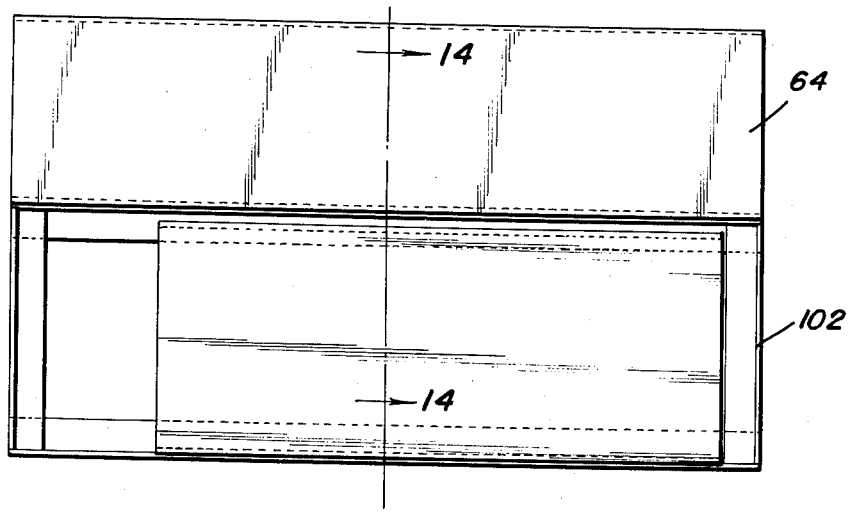
Figure 13 is an enlarged top plan view of the base frame of one of the legs of the U-shaped frame and the platform for the fluid control means associated therewith and showing the manner in which they are connected together.

Mounted on the leg 12 of the U-shaped frame 10 is a generally rectangular frame 102 which is best illustrated in Figures 13 and 14. The rectangular frame 102 is formed of angle irons and has a hollow interior. The frame 102 has a longitudinally extending edge which is secured to one of the flanges of the channel member 64 by welding or other convenient fastening means. Carried by the frame 102 is a platform in the form of an inverted channel-shaped member 104 whose flanges 105 have their lower edges resting upon the horizontal flanges of the angle members forming the frame 102 and welded thereto.

Referring now to Figures 10 and 11 in particular, it will be seen that mounted on one end of the platform 104 and secured thereto is an electric motor 106 having a drive shaft 108. The drive shaft 108 is connected to a drive shaft 110 of a pump 112 by a coupling 114. It will be understood that the pump 112 is of the centrifugal type and is intended to pump water at extremely high pressures. The pump 112 is provided with an inlet 116 at one side thereof which has connected thereto a supply pipe 118.

In order that the pump 112 may convey fluids, such as water, to the spray pipes 34 and 36, it is provided with an outlet opening 120 which is connected by piping 122 to a diverter valve 124. The diverter valve 124 is generally cross-shaped and has two opposed arms connected to piping 126 and 128, and the arm opposed to the piping 122 is provided with an actuating handle 130.

Referring now to Figure 16 in particular, it will be seen that the diverter valve 124 includes a housing 132 in which is mounted for rotation a valve element 134. The valve element 134 has a curved passageway 136 therein and is connected to the actuating handle 130 by which it is rotated. It will be understood that the ends of the passageway 136 are substantially 90 degrees apart whereby they may be aligned with bores through the housing 132 which are substantially 90 degrees apart. The housing 132 includes a first internally threaded fitting 138 to which the piping 122 is connected and spaced 90 degrees from the first fitting 138 are aligned fittings 140 and 142 to which are connected the piping 126 and 128, respectively. By rotating the actuating handle 130, the fitting 138 may be selectively communicated with the fittings 140 and 142.

It will be noted that the piping 128 is connected to the spray pipe 34 by a T-shaped fitting 144 whereby water or other fluids intended for rinsing purposes may be pumped directly to the spray pipe 34 from the pump 112 through the diverter valve 124. The piping 126 is secured to a T-fitting 146 which has one leg thereof secured to piping 148 and the other leg thereof secured to piping 150. The piping 148 is, in turn, connected to a T-shaped Venturi tube 152 which is best illustrated in Figure 17. It will be noticed that the T-shaped Venturi fitting 152 includes a housing 154 with a threaded opening 156 at the upper end thereof in alignment with the threaded opening 158 in the lower end. Disposed at right angles to the threaded openings 156 and 158 is a threaded opening 160. Communicating with the threaded opening 156 and forcing fluids flowing therethrough to be funneled through a narrow opening 162 thereby causing a venturi action is a tapered internal sleeve 162. The flow of fluids through the tapered sleeve 164 and out of the restricted opening 162 into the enlarged threaded opening 158 causes a vacuum in the portion of the housing 154 surrounding the tapered sleeve 164 and requires a suction in piping connected to the threaded portion 160.

Connected to the threaded portion 160 of the T-shaped Venturi fitting 152 is piping 166 which includes a control valve 168. It will be understood that the piping 166 is in generally parallel relation to the piping 150 and that the same are connected to a detergent supply tank 170. The detergent supply tank 170 is provided with a filler portion 172 at its upper end which is closed by a closure cap 174. The detergent supply tank 170 is also provided with a drain fitting 176 at its lower end.

In general operation, when the actuating handle 130 of the diverter valve 124 is rotated to a position whereby fluid flowing from the pump 112 passes into the T 146, a certain amount of the fluid passes through the piping 150 into the detergent supply tank 170 and out through the piping 166 into the T-shaped Venturi fitting 152. This is accomplished by the differential pressure caused by the venturi within the T-shaped Venturi fitting 152. Water or other fluids passing from the piping 148 into the T-shaped Venturi fitting 152 is mixed with detergent and passes through piping 178 to a T-fitting 180 mounted in the spray pipe 36.

In view of the foregoing, it will be seen that while the U-shaped frame 10 and its associated spray pipes 34 and 36 are being reciprocated back and forth along the track 72 the spray pipes 34 and 36 may be selectively supplied with either rinse fluids or washing fluids in order that a vehicle may be thoroughly washed. Inasmuch as the pump 112 and its associated motor 106 and piping are designed to travel with the U-shaped frame 10 due to the connection of the frame 102 to the channel member 64 of the leg 12, it will be understood that the preferred modification of the washing machine is a compact and self-sustaining unit. In order that the weight of the fluid control elements mounted on the platform 114 may be supported from the supporting surface 74 by other means than being completely dependent upon the support of the channel member 64, there is secured to the underside of the support 104 a U-shaped mounting bracket 181 which is provided with a transversely extending axle 182. Mounted on the axle 182 for rotation is a ground engaging wheel 184.

While the fluid control mechanism may be exposed if desired, it is preferred that the frame 102 be provided with a cabinet structure which is generally rectangular in shape and referred to in general by the reference numeral 186. It will be understood that the cabinet structure 186 has a portion 188 which is in face to face relation with the vertical portion 18 of the leg 12 and is secured thereto by welding or other conventional fasteners. The cabinet 186 is also provided with portions 190 which partially overlie the housing 62 and are welded thereto. The cabinet 186 is provided with a special offset portiton 192 at one end thereof for enclosing a portion of the detergent supply tank 170 which extends outwardly of the frame 102. It will be understood that the web portiton of the vertically extending portion 18 of the leg 12 will be provided with suitable openings 192 and 194 for the passage of the piping 128 and 178, respectively. It will be understood that the opening 194 also permits passage of the drive shaft 78 of the speed reducer 76.

When it is desired to mount the preferred form of vehicle washer, which is illustrated in Figures 1 through 18, inclusive, in a garage or other structure, the water supply pipe 118 is connected to a water hose 196 which is, in turn, connected to a water supply pipe 198 of the garage. The water supply pipe 198 is provided with a convenient shut-off valve 200. Inasmuch as the entire vehicle washing machine reciprocates back and forth along the track 72, it is obvious that the water hose 176 must be of considerable length so as to be connected between the pipes 118 and 198 at the ends of the travel of the vehicle washing machine. In order that the slack in the water hose 196 may be taken up at all times, it is passed over a pulley 202 carried by a bracket 204 which is mounted on one end of a flexible cable 206. The flexible cable 206 is entrained over a stationary pulley 208 and connected at its other end to a coil tension spring 210. The other end of the coil spring 210 is maintained in fixed relation to the pulley 208 by a fastener 212 which is connected to a supporting structure common to the supporting structure to which the pulley 208 is mounted.

In order that electricity may be supplied for the electric motors 88 and 106, a coil length of wire 214 extends from a conventional electrical outlet (not shown) and passes through a fitting 216 in the horizontal portion 20 of the leg 14. The electric wire 214 then passes through the web portion 16 and the leg 12 of the U-shaped frame 10 in between the plates 28 and 30 and the associated webs of the channel portions of the leg 12 and the web 16, respectively. As is best illustrated in Figure 7, the electric cable 214 is secured to the webs of the channel portion of the leg 12 and the web 16 by clamps 218. The end of the electric cable 214 associated with the U-shaped frame 10 terminates in a pair of switches 220 and 222 carried by the vertical portion 18 of the leg 12 spaced above the cabinet 186. With reference to the cabinet 186, it will be noted that in Figure 2 the cabinet 186 is illustrated as having a removable panel on the outer side thereof, the removable panel being referred to in general by the reference numeral 224 and is secured in place by a plurality of fasteners 226.

Referring now to Figure 18 in particular, it will be seen that the electric cable 214 is connected through a switch 228 to a power source. The switch 220, which is connected to the electric cable 214 is connected to the pump motor 106 and the switch 222 controls the flow of current to the motor 88 for driving the wheels 70. It will be understood that the switch 222 will be connected in series with the reversing switch 92 whereby the movement of the U-shaped frame 10 and the pumping of wash and rinse fluids may be separately controlled. Furthermore, the provision of the switch 228 permits the entire vehicle washing machine to be shut down by opening the same.

In the operation of the vehicle washing machine all of the operations may be controlled by a single attendant walking alongside the cabinet 186. It will be noted that the switches 220 and 222 are convenient to the cabinet 186 and that the actuating handle 130 is positioned closely adjacent the switches 220 and 222. Also, the filler cap 174 of the detergent supply tank 170 extends through the top of the cabinet 186 and is readily convenient for the filling of the detergent tank. The amount of detergent flowing into the piping 178 is controlled by the valve 168 which extends through the removable panel 224 of the cabinet 186. Also, the drain piping 176 of the detergent supply tank 170 passes through the outer side of the cabinet 186 whereby the detergent tank 170 may be conveniently drained. In order that isolated spots on the vehicle may be conveniently washed, the cabinet has an auxiliary pressure hose 230 extending outwardly therefrom. It is intended that this hose be utilized for the cleaning under fenders and the cleaning of wheels, etc. The flow of fluid through the hose 230 is controlled by a valve 231. Although the exact manner in which the hose 230 is connected to the piping within the cabinet 186 has not been illustrated, it will be understood that the connection therefor is conventional.

While it is normally desirable for the fluid control means to be mounted on the U-shaped frame, as illustrated in Figures 1 through 18, inclusive, in certain installations it is desirable to have the fluid control means separate from the U-shaped frame and the associated spray pipes. Referring now to Figure 19 in particular, it will be seen that there is illustrated such a form of vehicle washing machine and that the same includes a generally U-shaped frame 232 which includes a pair of vertically extending spaced parallel legs 234 and 236 which are connected at their upper ends by a web 240. The U-shaped frame 232 is provided with a pair of spray pipes 242 and 244 which function as rinse spray pipes and wash spray pipes, respectively. The leg 234 of the U-shaped frame 232 is provided with a pair of wheels 246 which are circumferentially grooved and mounted on a track 248. It will be understood that the wheels 246 are driven by electrical drive means (not illustrated) of the same type in the modification of Figures 1 through 18, inclusive, and that power to the electric motor is supplied by an electric cable 250 extending from the web portion 240. The other leg 236 is provided with a pair of ground engaging wheels 252.

Mounted in a cabinet 254 is an electric pump associated with piping 256 and 258 by a diverter valve having an actuating handle 260. The pipe 258 is connected to the rinse spray pipe 242 by a flexible hose 262 and the pipe 260 is connected to the wash spray pipe 244 by a hose 264. The hoses are connected together by couplers 266 at spaced intervals. Associated with the pipe 256 is a detergent supply tank whose filler cap 268 extends upwardly through the top of the cabinet 254. The flow of detergent into the pipe 256 is controlled by a valve handle 270 extending through the front side of the cabinet 254. The pump within the cabinet 254 is connected to a water supply line 272 and connected to the pump by piping (not shown) is a hose 274 for washing isolated spots of a vehicle.

It will be understood that when the modified form of vehicle washer, as illustrated in Figure 19 is in operation the U-shaped frame 232 reciprocates back and forth along the track 248 due to the operation of a reversing switch (not shown) similar to the reversing switch of the preferred modification. It will be understood that the operation and function of the modified form of vehicle washer is identical with the preferred form with the exception that the cabinet and its associated fluid control means does not reciprocate with the U-shaped frame.

Referring now to Figures 20, 21 and 22 in particular, it will be seen that there is illustrated another form of fluid control means which may be utilized with either the preferred modification or the modification of Figure 19. The modified form of fluid control is similar to the previously described fluid control means in that it includes a centrifugal pump 276 driven by an electric motor 278 mounted on a common base 280. The centrifugal pump 276 is provided with an inlet 282 which is connected to a water supply pipe 284 through which the flow of fluid is controlled by a master shut-off valve 286. Water passing out of the outlet 288 of the pump 276 passes through piping 290 to a diverter valve 292 which is controlled by an actuating handle 294. The diverter valve 292 is provided with two outlet openings, one outlet opening being connected directly to a spray pipe 296 and the other outlet opening being connected to piping 298. The piping 298 is provided with a T-shaped fitting 300 which is connected to the upper end of a detergent supply tank 302, and a T-shaped Venturi fitting 304 which is connected to the lower portion of the detergent supply tank 302. Adjacent the T-shaped Venturi fitting 304 is a control valve 306 for controlling the flow of detergent from the tank 302 into the T-shaped Venturi fitting 304. Communicating a spray pipe 308 with the T-shaped Venturi fitting 304 is piping 310.

Connected to the piping communicating the spray pipe 296 with the diverter valve 292 is a section of tubing 312 which communicates the piping with a fluid motor 314. A similar fluid motor 316 is connected to the piping 298 by a section of tubing 318. The fluid motors 314 and 316 are identical and are best illustrated in Figure 21. For purposes of explanation it will be understood that the fluid motor illustrated in Figure 21 is the fluid motor 314 and that the same includes a two-piece housing 320 which has a diaphragm 322 extending between the two halves of the housing. The top half of the housing 320 is provided with a threaded fitting 324 in which is secured one end of the section of tubing 312. The other half of the housing 320 is provided with a boss 326 to which is connected by a screw 328 a switch housing 330. The boss 326 is provided with a concentric bore 332 in which is located for reciprocation a shaft 334 whose upper end is connected to the diaphragm 322. Disposed between the diaphgram 322 and the inner surface of the lower half of the housing 320 is a coil spring 336.

The housing 330 is provided with a removable cap 338 which is secured thereto by locking screws 340. The cap 338 is provided with an insulated center section 342 disposed on the inner side thereof. Carried by the insulated center section 342 is a pair of contacts 344 which have fasteners 346 extending outwardly therefrom. The fasteners 346 pass through insulated plugs 348 in the cap 338 and have secured on their other ends wires connected thereto by nuts 350.

When it is desired to pump water with the centrifugal pump 276, the electric motor 278 for driving the same is actuated. However, inasmuch as the pump 276 is of the centrifugal type it is necessary that it be supplied with water at all times when it is revolving in order to prevent same from overheating and resulting in damage to the parts thereof. The water passing through the water supply pipe 284 is under normal hydrant pressure and will pass into the spray pipes 296 and 308 and out of spray nozzles (not shown) associated therewith at any time the diverter valve 292 is positioned so as to communicate the same with the spray pipes. The movement of the diverter valve 292 to one of these positions will permit fluid under slight pressure to pass either of the fluid motors 314 or 316. Assuming that the water passes into the fluid motor 314, it will fill the upper half of the housing 320 and cause the diaphragm 322 to move downwardly due to the pressure exerted thereon. Downward movement of the diaphragm 322 results in associated downward movement of the shaft 334 with the result that a pair of movable contracts 352 will engage the fixed contacts 344 and cause the closing of the circuit.

Referring now to Figure 22, it is seen that the electric motor 278 is connected to a power source by an electric cable 354 having a master switch 356 therein. One lead of the electric cable 354 passes into a connection with a pair of leads 358 and 360. The lead 358 is associated with the switch of the valve 316 and the lead 360 is associated with the switch of the valve 314. The switches of the fluid motors 314 and 316 are connected to a common lead 362 which is, in turn, connected to the electric motor 378. It will be seen that even though the master switch 356 is closed, the electric motor 278 will not be actuated unless either one of the switches associated with the fluid motors 314 and 316 are closed. In this manner burning up of the centrifugal pump 276 is prevent as the pump cannot be driven unless water has been applied to one of the fluid motors 314 and 316 through the water supply pipe 284.

In view of the foregoing, it will be noted that there have been devised two forms of vehicle washing machines which may be conveniently installed in service stations or other suitable buildings at a minimum of labor. The installation of one of the vehicle washing machines requires only that a single track being installed upon the floor of the service station and that a suitable water supply pipe and electric outlet be furnished. Inasmuch as the electric outlet and the water supply pipe is generally handy and the service station, it is normally found that it is unnecessary to provide these in the installation of one of the vehicle washing machines. Not only is the vehicle washing machine easily installed, but it is simple in its operation and although manual control of the spring is necessary, it may be easily operated by a single operator who may walk alongside the machine as it reciprocates over a stationary vehicle being washed.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. In an automatic vehicle washer, an inverted U-shaped frame adapted to reciprocate over a stationary vehicle, spraying means carried by said frame including a pair of spray pipes, means for supplying fluid under pressure to said spray pipes including a pump and an actuator therefor, means for selectively directing fluid supplied by said last means to the spray pipes, means responsive to fluid pressure in each of said spray pipes to control said pump actuator, and means carried by said frame to drive same.

2. In a vehicle washer, an inverted U-shaped spray loop comprising a pair of spaced parallel first and second spray pipes, each of said pipes having spaced discharge orifices therein directed towards the interior of the spray loop, means for supporting and guiding reciprocating movement of the spray loop in a direction transverse of the plane of the spray loop, means for reciprocating the spray loop, a pump associated with said spray loop, a prime mover driving said pump, means for causing actuation of said prime mover when fluid pressure in either of said spray pipes exceeds a predetermined amount, valvular means for selectively directing a fluid from the pump to said first and second spray pipes, and means for introducing a detergent into the first spray pipe.

3. In a vehicle washer, an inverted U-shaped spray pipe, means for supporting and guiding reciprocating movement of the spray pipe in a direction transverse of the plane of the spray pipe, a pump having drive means, means for rendering said drive means ineffective upon fluid pressure in the spray pipe being below a predetermined amount, means for directing fluid from said pump to said spray pipe, said spray pipe having spaced discharge orifices therein directed towards the center of the area enclosed by said spray pipe, the first mentioned means including a U-shaped supporting frame for said spray pipe, said frame having legs connected by a web, wheels at the lower ends of said legs, said wheels including a floor engaging wheel and a track engaging wheel, and means including an electric motor carried by one of said legs for driving certain of said wheels.

4. In a vehicle washer, an inverted U-shaped spray pipe, means for supporting and guiding reciprocating movement of the spray pipe in a direction transverse of the plane of the spray pipe, a pump having drive means, means for rendering said drive means ineffective upon fluid pressure in the spray pipe being below a predetermined amount, means for directing fluid from said pump to said spray pipe, said spray pipe having spaced discharge orifices therein directed towards the center of the area enclosed by said spray pipe, the first mentioned means including a U-shaped supporting frame for said spray pipe, said frame including legs connected by a web, a pair of wheels carried at the lower end of one of said legs, a ground engaging wheel carried by the other of said legs, said pair of wheels being guidingly mounted on a track, an electric motor carried by said one leg, drive means connecting said electric motor to said pair of wheels.

5. The combination of claim 4, wherein said pump and its associated drive means being mounted on a platform partially supported by one of said legs, said platform being provided with an auxiliary support wheel.

6. In a vehicle washer, an inverted substantially U-shaped spray unit having a web portion and opposing legs, one of said legs carrying ground engaging supporting means on its lower end and the other of said legs carrying driven guide means on its lower end for movement on a ground supported guide member and drive means carried by the other leg for driving said guide means.

7. In a vehicle washer, an inverted U-shaped frame, spray pipes carried by said frame, said frame including legs connected at their upper ends by a web, one of said legs being provided with a ground engaging wheel, the other of said legs being provided with guide wheels mounted on a track, drive means carried by said other leg for driving said guide wheels, said guide wheels being in longitudinal alignment.

8. In a vehicle washer, an inverted U-shaped frame, spray pipes carried by said frame, said frame including legs connected at their upper ends by a web, one of said legs being provided with a ground engaging wheel, the other of said legs being provided with guide wheels mounted on a track, drive means carried by said other leg for driving said guide wheels, said guide wheels being in longitudinal alignment, first control means for controlling the movement of said frame, and second control means for controlling the flow of spray fluid to said spray pipe, said first and second control means being associated with said frame for reciprocating movement therewith.

9. In a vehicle washer, an inverted U-shaped frame, spray pipes carried by said frame, said frame including legs connected at their upper ends by a web, one of said legs being provided with a ground engaging wheel, the other of said legs being provided with guide wheels mounted on a track, drive means carried by said other leg for driving said guide wheels, said guide wheels being in longitudinal alignment, first control means for controlling the movement of said frame, and second control means for controlling the flow of spray fluid to said spray pipe, said first and second control means being associated with said frame for reciprocating movement therewith and mounted on a platform partially supported by said other leg.

10. In a vehicle washer, an inverted U-shaped frame, spray pipes carried by said frame, said frame including legs connected at their upper ends by a web, one of said legs being provided with a ground engaging wheel, the other of said legs being provided with guide wheels mounted on a track, drive means carried by said other leg for driving said guide wheels, said guide wheels being in longitudinal alignment, first control means for controlling the movement of said frame, and second control means for controlling the flow of spray fluid to said spray pipe, said first and second control means being associated with said frame for reciprocating movement therewith and mounted on a platform partially supported by said other leg, said platform being provided with a ground engaging wheel.

11. In a vehicle washer, a supporting surface, a single track mounted on said supporting surface, a frame mounted on said supporting surface and having a supporting surface engaging wheel at one side, track engaging wheels at the other side of said frame guidingly mounted on said track, drive means carried by said frame for driving said track engaging wheels, spray means carried by said frame.

References Cited in the file of this patent

UNITED STATES PATENTS

| | | |
|---|---|---|
| 1,952,265 | Leland | Mar. 27, 1934 |
| 2,465,562 | Hopper et al. | Mar. 29, 1949 |
| 2,558,472 | Wilcox | June 26, 1951 |
| 2,648,342 | Vani et al. | Aug. 11, 1953 |
| 2,699,792 | Fisher | Jan. 18, 1955 |